United States Patent

[11] 3,629,855

[72] Inventor James W. Conley
Scotia, N.Y.
[21] Appl. No. 863,217
[22] Filed Oct. 2, 1969
[45] Patented Dec. 21, 1971
[73] Assignee General Electric Company

[54] DATA ACQUISITION AND IDENTIFICATION SYSTEM
14 Claims, 8 Drawing Figs.

[52] U.S. Cl. .......... 340/172.5
[51] Int. Cl. .......... G11b 13/00
[50] Field of Search .......... 340/172.5

[56] References Cited

UNITED STATES PATENTS

| | | | |
|---|---|---|---|
| 3,323,110 | 5/1967 | Oliari et al. | 340/172.5 |
| 3,331,055 | 7/1967 | Betz et al. | 340/172.5 |
| 3,399,385 | 8/1968 | Gorman et al. | 340/172.5 |
| 3,436,733 | 4/1969 | Pearce et al. | 340/172.5 |
| 3,436,732 | 4/1969 | Charters | 340/172.5 |
| 3,438,019 | 4/1969 | Gowan | 340/172.5 X |

*Primary Examiner*—Paul J. Henon
*Assistant Examiner*—Ronald F. Chapuran
*Attorneys*—John F. Ahern, Paul A. Frank, Jerome C. Squillaro, Frank L. Neuhauser, Oscar B. Waddell and Joseph B. Forman

ABSTRACT: A method and apparatus are disclosed for monitoring a plurality of signal sources to detect the time of occurrence of a change in signal condition from any of the signal sources, the sign of the change and the signal source generating the change. The monitoring is performed by source-associated receivers which generate an "event flag" upon occurrence of a change in signal condition. The outputs of each receiver are combined in intermediate level selectors for use by a master level selector to enable an address scanner to search the level selectors for the receiver generating the "event flag" and to record the time of occurrence of the "event flag." When the particular receiver which generated the "event flag" is found, its address and the sense of the change are also recorded.

INVENTOR:
JAMES W. CONLEY,
by Jerome C. Squillaro
HIS ATTORNEY

INVENTOR:
JAMES W. CONLEY,
by [signature]
HIS ATTORNEY

PATENTED DEC 21 1971 3,629,855

SHEET 3 OF 5

INVENTOR:
JAMES W. CONLEY,
by [signature]
HIS ATTORNEY

INVENTOR:
JAMES W. CONLEY,
by [signature]
HIS ATTORNEY

INVENTOR:
JAMES W. CONLEY,
by Jerome C. Squillaro
HIS ATTORNEY

DATA ACQUISITION AND IDENTIFICATION SYSTEM

The present invention relates to communication systems and more particularly to data acquisition and identification systems which receive information either analog or digital from a plurality of signal sources for storage or use by a computer.

In the area of process control systems, for example, process information such as the magnitudes of flows, temperatures, pressures, speeds, forces, purities, etc., are generally sensed by transducers which provide electrical analog signals representative of the process variables. These signals are usually generated in locations remote from a central processing area and are brought to the processing area by individual cables or transmission lines. Each signal is generally standardized and filtered on an individual basis so that all signals may be time-shared in subsequent processing equipment. To provide this time-sharing or multiplexing, low speed mechanical switches such as crossbar switches or stepping switches are used. More recently, solid state or relay switching matrices have been employed to perform this function; however, such systems are of considerably higher cost. After selection, by whatever means employed, the selected signal is generally next applied to an isolation amplifier to reduce the effects of common mode voltages. This signal is then applied to an analog to digital converter which generates a digital representation of the voltage signal. The digital word is then stored in a memory system until the process control system i ready to accept the information.

In addition to the foregoing equipment, conventional process control systems generally require the use of a controller to generate the necessary control signals which insure that the various components or modules operate in the proper sequence and provide status symbols to the operating system. It is obviously desirable that such systems have the capability of high speed of data acquisition and identification with good accuracy, resolution and high reliability at reasonably low cost. However, several areas of weaknesses exist in conventional implementation systems. Of primary concern, for example, is the ability to increase the common mode rejection of noise and increase the speed of data acquisition and identification so that information can be transferred to a computer for analysis and control of the parameters of the process being monitored.

Accordingly, among the objects of the instant invention are to provide a data acquisition and identification system which exhibits fast data acquisition and identification with a high degree of immunity to noise signals and which avoids mechanical switching or multiplexing problems.

Another object of the invention is to provide a system wherein analog signals representative of process information are converted to pulse analog, frequency or pulse width modulated signals for transmission from a remote location to a central data processing system which identified the line on which a signal event has occurred, records the time and sense of the event.

Another object of the invention is to provide an improved method for monitoring a large number of signal sources and identifying a change in signal condition, the sense of the change and the time of the change with improved accuracy, greater speed and with greater tolerance to noise signals at reduced costs and with greater reliability.

In one embodiment of the invention, these and other objects are attained by providing signal converters near the source of the analog signals to convert the analog signals to logic levels for transmission to a central processor which detects a changed logic condition or an event occurring at any of a plurality of line receivers and at that time transfers the contents of a continuously counting counter to a buffer for subsequent transfer to a central processor or computer. When the event occurs, an "event flag" or enable signal is sent to one or more level selectors and eventually to a master level selector of the data acquisition and identification system. The master level in turn sends an enable signal to an address counter which starts a search of its lower level selectors and line receivers to find the line receiver which generated the "event flag." When the particular line receiver is found, the sign or sense of the event, the line address and the time of occurrence of the event as represented by the contents of the buffer are sent to the central processor or computer for storage and subsequent processing.

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF THE FIGURES

By way of example, FIG. 1 illustrates an embodiment of a data acquisition and identification system 10 comprising a plurality of signal sources 11*a* through 11*n* and generally designated by the numeral 11 which may, for example, provide analog signals from transducer elements representative of temperatures, pressures, speeds, forces, purities, magnitudes of flow, or other process variable signals. Signal source 11 may, for example, be thermocouples, tachometers, accelerometers, flow meters, etc. Since signal sources 11 are, in general, remotely located, it is necessary to being these signals to a central processing area by individual transmission lines. However, the signals are generally of low amplitude and subject to noise pickup, therefore it is desirable to convert the analog signals to logic level signals as close to the signal source as possible to prevent noise contamination of the signals and to provide convenient signals for transmission to the centrally located processing area. This is preferably performed by signal conditioners 12*a* through 12*n* and generally designated by the numeral 12 which may take any of various configurations; however, it is preferable that the signal conditioner convert the analog signal to a logic level signal. A suitable signal conditioner for converting analog signals to logic level signals is described in my copending application, Ser. No. 846,007 filed July 30, 1969 also assigned to the present assignee. This signal conditioner is an asynchronous analog to logic level converter which produces a logic level output signal having a first period, $T_1$, proportional to the amplitude of the input signal and a second period of a changed logic level for a period, $T_2$, inversely proportional to the difference in amplitude between a reference signal and the input signal. Other possible signal conditioners useful in practicing the instant invention are, for example, voltage-to-frequency converters, voltage-to-pulse width converters and voltage-to-pulse amplitude converters.

Figure 1:
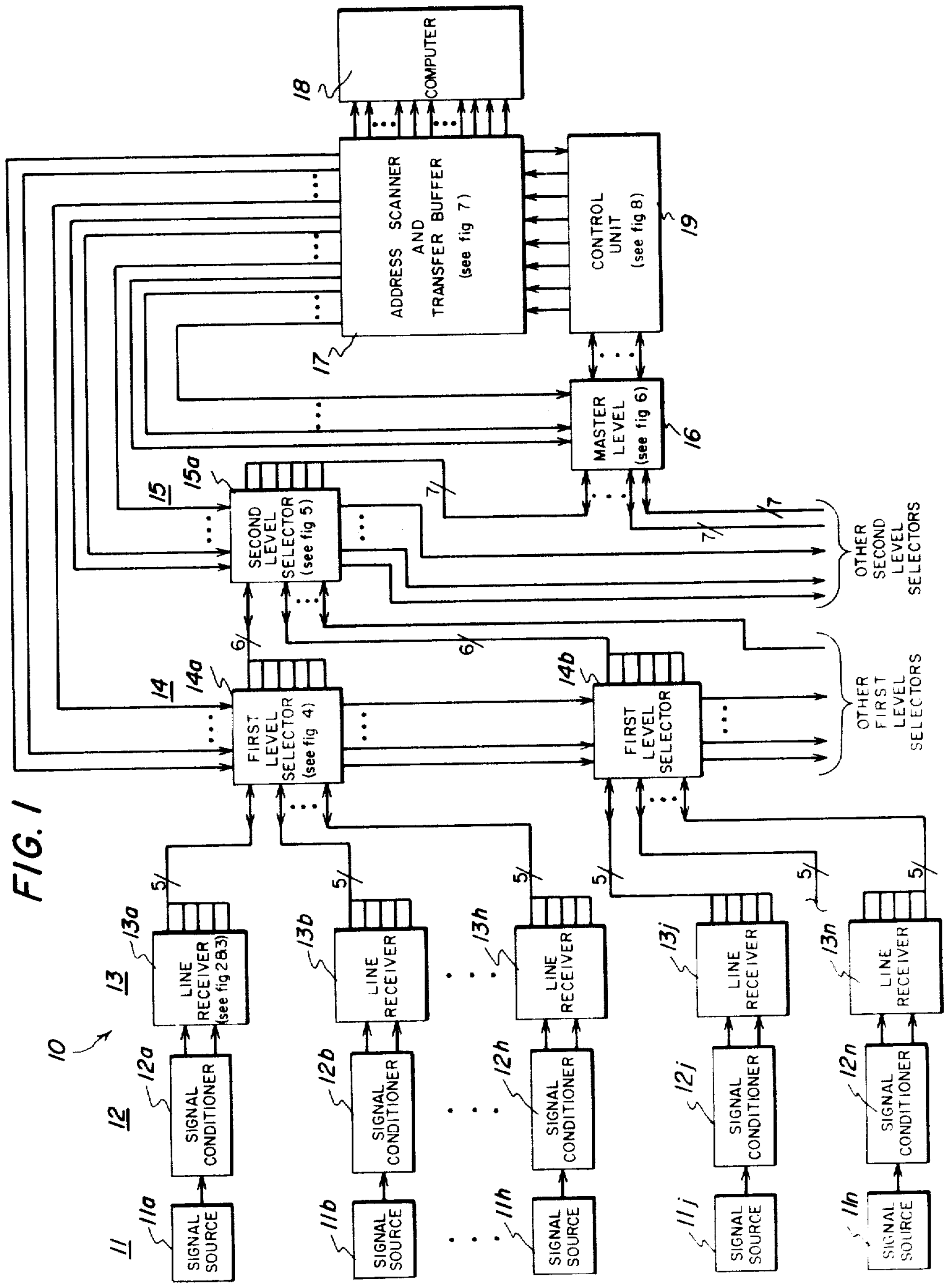
FIG. 1 is a block diagram of a data acquisition and identification system in accord with one embodiment of the invention.

The signal conditioners 12 are connected via a desired length of transmission line to a like plurality of line receivers 13*a* through 13*m* and generally designated by the numeral 13, which produce an "event flag" or enable signal when the input of the line receiver changes logic conditions as a result of a change in signal conditions. The "event flag" is a changed logic signal condition occurring substantially simultaneous with the occurrence of the changed signal condition from the signal conditioner 12.

Line receivers 13, in addition to performing the functions to be described hereinafter with reference to FIG. 2, may also include any necessary signal shaping or voltage translating functions necessitated by the type of transmission line employed. For example, in the event that the transmission line employed differentiates the transmitted logic signal, it may be desirable to reshape the signal and separate the positive and negative going portions of the signal into two different signal lines. Circuits for performing such functions are well known in the art and need not be described herein. Additionally, depending upon the nature of the signal conditioner and the type of signal transmitted, it may be necessary or desirable to convert from one logic system to another; however, circuits for making such conversions are well known in the art and do not form a part of this invention. These additional functions are mentioned only to illustrate the versatility and adaptability and of the instant invention to various input signal conditions.

The outputs of several line receivers, for example, line receivers 13*a* through 13*h* have their outputs connected to a first level selector 14*a* of a plurality of first level selectors, generally designated by the numeral 14. Line receivers 13*i* through 13*n* have their outputs connected to first level selector 14*b*. As will become evident from the description hereinafter, the number of line receivers connected to a particular first level selector is a matter of design choice dependent upon the number of signal sources and the "fan-in" capability (i.e., number of permissible inputs per logic element) of the logic elements in the level selector. Additionally, the number of line receivers may vary from 2 to any finite number of integer, $n$ and the number of first level selectors may vary from 0 to any finite number, $k$, where $k$ is less than $n$.

The outputs of the first level selectors 14*a* and 14*b*, along with any other first level selectors, are connected to a second level selector 15*a* of a group of $j$ second level selectors, generally designated by the numeral 15. One function of the first and second level selectors is, upon receipt of an event flag, to cause a signal to be sent to the next higher level of selection. For example, an event flag issuing from line receiver 13*a*, causes first level selector 14*a* to send a signal to the second level selector 15*a* which in turn, sends a signal to a master level selector 16 which in turn sends a signal to an address scanner and transfer buffer unit 17 through a control unit 19. The time at which an event flag is received by the address scanner and transfer buffer unit 17 is represented by the contents or count of a continuously clocked counter which is transferred to a buffer register in the address scanner and transfer buffer unit 17. The contents of the buffer register are subsequently transferred to a computer or storage device 18 for later processing.

An event flag generated by any of the line receivers 13*a* through 13*n* will cause the foregoing events to occur; therefore, it is desirable not only to know that a particular event has occurred and the time of occurrence, but also to know on which line the event occurred. To find the particular line in question, a search or scanning procedure must be initiated. In accord with one of the novel features of the instant invention, this is performed by an address counter which when enabled by an event flag begins a systematic search of the second level selectors connected to the master level selector to determine through which second level selector the event flag was transmitted. When the particular second level selector through which the event flag is transmitted to the master level is selected (i.e., identified), this portion of the search action is inhibited. An address counter associated with the second level selectors is now allowed to search its input lines from the first level selectors to determine through which first level selector the event flag was transmitted. When the particular first level selector transmitting the event flag is found, this portion of the search is terminated. Finally, an address counter associated with the first level selectors is allowed to search its input lines to determine which line receiver originated the event flag. When the particular line receiver is found, the search is terminated. At this point, the contents of the address registers contain a line receiver identification number which is transferred to the buffer unit 17 and then to the computer 18.

The remaining bit of information required to define the event flag is the sense or sign of the transition, i.e., positive going or negative going. This information is obtained from the particular line receiver generating the event flag and will be described hereinafter with reference to the detailed description of the line receivers. The sign information thus obtained is transferred to the buffer unit and to the computer. The data acquisition and identification system has now completed one cycle of operation by acquiring data and identifying the source of the data. The system is now ready to react to the next event.

It should be understood that although a computer 18 is illustrated as receiving the outputs of the address scanner and transfer buffer unit 17, other utilization devices are also contemplated. For example, if the data acquisition and identification system is adapted to monitor faults in a high voltage transmission system, the output of the buffer unit 17 can be used to operate a circuit breaker to prevent damage to the rest of the system. Another example of a different utilization device might be in the area of process control systems where an event flag occurring from a particular receiver may indicate the need to vary the temperature or pressure, for example, of the process, which variable may be controlled directly by the occurrence of a single event flag or possibly several event flags before a correction is made. Obviously, there are enumerable utilization devices which can be employed and the foregoing examples are merely illustrative thereof. Accordingly, it is to be understood that the term computer is meant in a broad sense as any device which upon receipt of information from the data acquisition and identification system of the instant invention utilizes the information in some way.

Although the embodiment of the invention illustrated in FIG. 1 comprises $n$ line receivers, $k$ first level selectors, $j$ second level selectors and one master level selector where $n$, $k$ and $j$ are integers and $n$ is greater than $k$ which is greater than $j$, it is to be understood that in one of the simpler embodiments of the invention, $k$ and $j$ may be zero. For example, if the number of signal sources $n$ to be monitored are small (e.g., 2 through 6 or 8), it may be desirable to reduce or completely eliminate the first and second level selectors and connect the output of the line receivers directly to the master level. In this situation, a line receiver generating an event flag is found merely by searching the master level. If, however, 16 signal sources are to be monitored, it may be desirable to employ two first level selectors with each selector connected to the output of eight line receivers. The outputs of the first level selectors may then be connected directly to the master level selector without employing a second level selector. In this situation, a line receiver generating an event flag is found by first searching the master level to determine through which first level selector the event flag was transmitted and then search the particular first level selector to locate the line receiver generating the event flag. In this particular situation, $n$ is 16, $k$ is 2 and $j$ is 0.

Still another embodiment of the instant invention may be illustrated by considering the situation where 512 signal sources are to be monitored. In this situation, it may be desirable, for example, to employ 64 first level selectors with each selector connected to a different group of eight line receivers. The outputs of the 64 first level selectors may be combined in eight second level selectors and the outputs of these selectors connected to the master level. A line receiver generating a flag is found by first searching the master level for the second level selector transmitting the event flag, and then having found that particular second level selector, a search is then made of that selector for the first level selector transmitting the flag. Having found the particular first level selector, a search is then made of that selector to find the line receiver generating the event flag. In this situation, $n$ is 512, $k$ is 64 and $j$ is 8.

From the foregoing specific examples, it can be readily appreciated that the number of intermediate level selectors (i.e., first and second level) is a matter of design choice depending in part on the number of signal sources to be monitored, the "fan-in" capability of the logic gages and as will be better understood from the description hereinafter, the speed of selecting or identifying a line receiver which generated an event flag.

Having thus described the overall functional operation of an embodiment of the instant invention with reference to FIG. 1, a detailed description of how this function is achieved will now be considered. Specifically, FIG. 2 illustrates one embodiment of a line receiver 13 adapted to receive any random sequence of signal conditions on input lines 29 and 30. Each line is connected to one input of a two-input NAND-gate 31 with its output connected to one input of a two-input NAND-gate 32 which has its output connected to one input of a two-input NAND-gate 33 having its output providing an event flag line receiver signal (EFLR–0) to a first level selector. The "–0" indicates the active condition of the line. The output of the NAND-gate 33 is also connected to an inverter 34 with its output connected to one input of a two-input NAND-gate 35 having a second input for receiving an address line receiver select signal (ALRS–1) applied thereto when the receiver is being interrogated or searched to see if it is the line receiver which has originated the event flag. The "–1" indicates the active condition of the line. The output of the NAND-gate 35 is sent back to the control unit 19 to inhibit the address counter from further action as described previously in the event that the particular line receiver being searched is the one which originated the event flag. This output line is designated the select condition line receiver (SCLR–0). This signal is also coupled to an inverter 36 which has its output connected to one input of a two-input NAND-gate 37 and one input of a two-input NAND-gate 38 which has its second input connected to receive a restore command signal (RCOM–1) from the control unit 19 for restoring the condition of the line receiver to its initial status. The output of the NAND-gate 38 is connected to one input of a two-input NAND-gate 39 which has its other input connected to the output of NAND-gate 32 and its output connected to the second input of NAND-gate 32. NAND-gate 32 and NAND-gate 39 perform a latching function as will be described hereinafter. NAND-gate 37 has its second input connected to input line 30 and its output, indicative of the sign or sense of the change in signal condition at the input of the line receiver, is designated as sign bit line receiver (SBLR–0).

Figure 2:
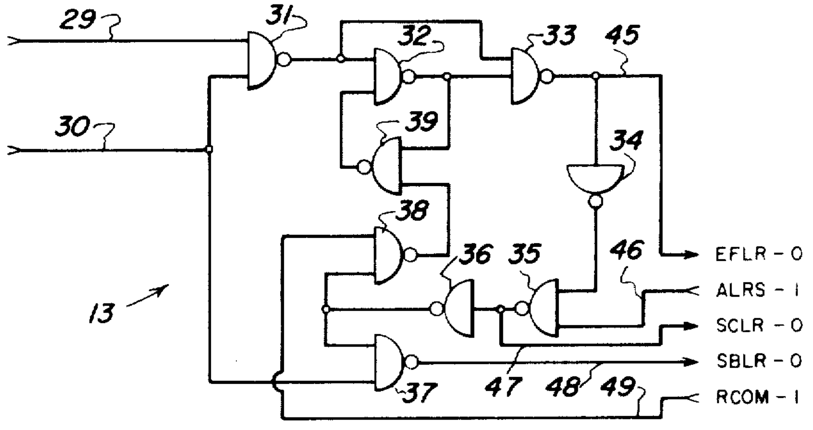
FIG. 2 is a logic diagram of a line receiver in accord with an embodiment of the present invention.

The operation of the line receiver illustrated in FIG. 2 will be better understood by considering the sequence of events which occur when an input signal is applied to NAND-gate 31. For example, if the initial output conditions of all NAND-gates except NAND-gates 31 and 39 are a logic "1" and input lines 29 and 30 are in a logic "1" condition, then a logic "0" appearing on line 29 will cause a logic "1" to appear at the output of NAND-gate 31 which in turn will cause a logic "0" or event flag to occur on EFLR line 45. The logic "1" at the output of NAND-gate 31 will not, however, affect the output of NAND-gate 32 which initially has a logic "1" at its output. The event flag appearing on EFLR line 45 is sent up to the master level as described above and in response thereto, a search of the level selectors and eventually the line receivers is made to determine which line receiver originated the flag. Accordingly, at some point in time a logic "1" will appear on ALRS line 46 to interrogate the line receiver. In the situation being considered, EFLR line 45 is in the active logic "0" state, thereby providing a logic "1" at the input of NAND-gate 35. When ALRS line 46 is interrogated, a logic "1" is applied to the other input of NAND-gate 35 which in turn produces a logic "0" at its output. As described previously, this output signal, SCLR, is sent back to the control unit 19 to indicate that this line receiver originated the event flag.

At the same time that the ALRS line 46 was interrogated by a logic "1," a logic "1" was applied to one input of NAND-gate 37 which, having a logic "1" at its other input, causes the output of NAND-gate 37 to go to a logic "0" condition. An active "0" on SBLR line 48 indicates the sign or sense of the change appearing on lines 29 and 30. In the situation being described, line 29 changed from a logic "1" to a logic "0" and line 30 remained unchanged; therefore, the logic "0" appearing at the output of NAND-gate 37 indicates that a change occurred on line 29. In the event that the initial change had occurred on line 30, the output of NAND-gate 37 would have remained at a logic "1" thereby indicating the change is occurring on line 30.

To restore the system to an "unflagged" status, a restore command represented by a logic "1" is received on RCOM line 49 from the control unit 19 which causes NAND-gate 38 to change to a logic "0" at its output which in turn causes NAND-gate 39 to change to a logic "1" at its output. NAND-gate 32 then changes to the condition with a logic "1" at its output. The latching action of NAND-gates 32 and 39 causes this state of logic to be maintained until input line, 29 or 30 which was active, returns to its inactive "1" level. At this time, a logic "0" appears on NAND-gate 31 which causes the logic states of NAND-gates 32 and 39 to revert to their inactive state. The line receiver 13 is then ready to receive a new input signal on either line 29 or 30.

The line receiver described with reference to FIG. 2 above, exhibits a great degree of versatility in that it is capable of accepting an input on line 29 followed immediately by an input signal on line 30 or vice versa. There need be no time delay between the two input signals. The only delay needed, if any, is that caused by the response time of the particular NAND-gates. Additionally, in the event that two sequential inputs are applied on lines 29 and 30, respectively, the only requirement imposed thereon is that the signal appearing on line 30 have a pulse width greater than the search or scan time required to locate the line receiver generating the event flag. As will be illustrated hereinafter, this time is exceedingly short for the system described. Still an additional feature of this line receiver is the fact that input signals can be applied in any combination or in any random sequence. This feature is particularly desirable when the line receiver is operated in conjunction with a transmission line which by design or otherwise delivers a differentiated pulse at the inputs of NAND-gate 31.

Figure 3:
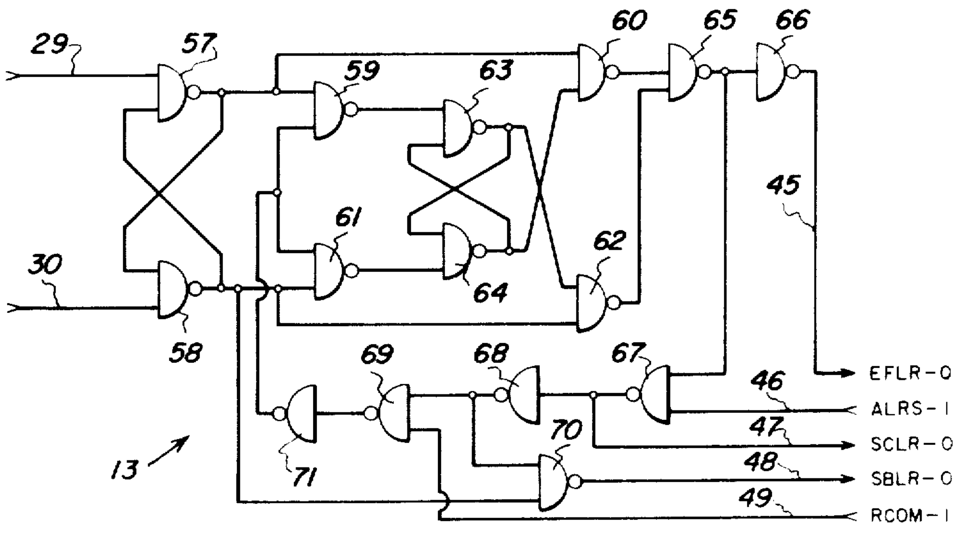
FIG. 3 is a logic diagram of an alternative embodiment of a line receiver.

An alternate embodiment of a line receiver is illustrated in FIG. 3 wherein alternating input signals are required on lines 29 and 30. In this configuration, input lines 29 and 30 are inactive in the same logic condition, i.e., a logic "1." As illustrated, input line 29 is connected to NAND-gate 57 and input line 30 is connected to NAND-gate 58. If, for example, the logic condition of line 30 switches to a logic "0" condition, the output of NAND-gate 58 switches to a logic "1" and the output of NAND-gate 57 switches to a logic "0." The output of NAND-gate 57 is connected to the inputs of NAND-gates 59 and 60 and the output of NAND-gate 58 is connected to the inputs of NAND-gates 61 and 62. The outputs of NAND-gates 59 and 61 are connected to NAND-gates 63 and 64, respectively, which are connected in a cross-coupled latch arrangement such that when a logic "1" appears at the output of NAND-gate 58, the output of NAND-gate 62 switches to a logic "0" condition causing a NAND-gate 65 to switch to a logic "1" at its output and through inverter 66 provide a logic "0" condition indicative of an event flag which is processed as described above with reference to the line receiver of FIG. 2.

In response to the event flag, a search is made to find the line receiver which generated the event flag. When an interrogation pulse is applied to ALRS line 46, NAND-gate 67 switches to a logic "0" at its output to indicate to the control unit 19 that the particular line receiver in question has been found and to stop the search operation. The logic "0" from the NAND-gate 67 is inverted in inverter 68 and is applied to NAND-gates 69 and 70. NAND-gate 70 has a second input connected to the output of NAND-gate 58 for indicating the sign or sense of the change on SBLR line 48. Since input line 30 switched from a logic "1" to a logic "0," NAND-gate 70 indicates this change by switching from a logic "1" to a logic "0."

As described above with reference to FIG. 2, the control unit 19 now has all the information necessary to identify the particular line receiver in question which generated the event flag and the line receiver can now be restored to an inactive condition. This is accomplished by applying a logic "1" signal on the RCOM line 49 which causes NAND-gate 69 to switch to a logic "0" at its output. This signal is connected to NAND-gates 59 and 61 through an inverter 71. When this logic level is a "1," the state of NAND-gate 63 is allowed to assume the state of NAND-gate 57. Similarly, the state of NAND-gate 64 is allowed to assume the state of NAND-gate 58. The event flag on EFLR line 45 exists in its active "0" state only during the time the correspondence just described, is disturbed by a signal on line 29 or 30 and the RCOM signal on line 49.

In the embodiment of the line receiver illustrated in FIG. 3, the order in which the input lines 29 and 30 are caused to be active, i.e., logic "0," must alternate. For example, where input line 30 has been active, the status of NAND-gate 63 remains in the "0" logic state after the RCOM signal occurs. A subsequent signal on line 30 does not cause an event flag to be generated because the output of NAND-gate 62 is forced to remain in the logic "1" state by the output of NAND-gate 63. Therefore the next active input must appear on line 29.

The foregoing embodiments of a line receiver useful in practicing the instant invention are not meant to be by way of limitation, but rather to illustrate the different type receivers that could be employed. Additionally, whereas the line receivers described with reference to FIGS. 2 and 3 are for use with two-wire transmission lines, obviously single wire transmission lines could likewise be used. In this latter situation, the line receiver of FIG. 3 may be modified, for example, by eliminating NAND-gates 57 and 58 and connecting line 29 directly to the input of NAND-gate 59 and by connecting an inverter between line 29 and the input of NAND-gate 61. Such a modification will accommodate single wire transmission line signals.

Figure 4:
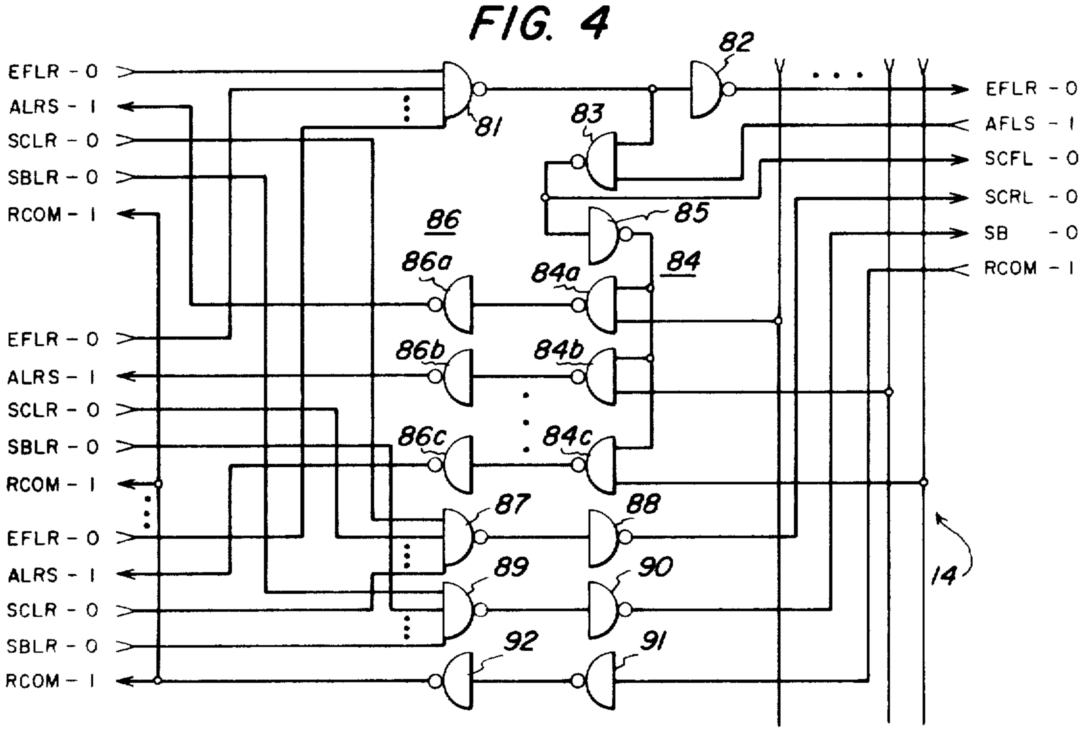
FIG. 4 is a logic diagram of a first level selector of the data acquisition and identification system of the present invention.
Figure 5:
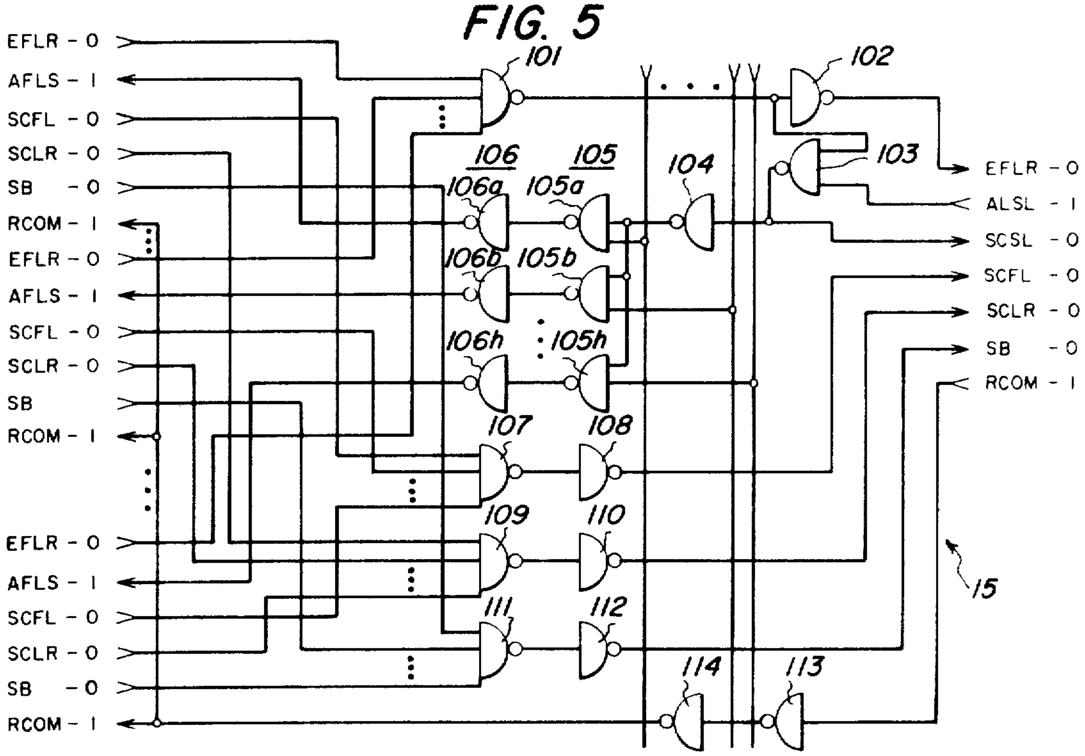
FIG. 5 is a logic diagram of a second level selector of the data acquisition and identification system of the present invention.
Figure 6:
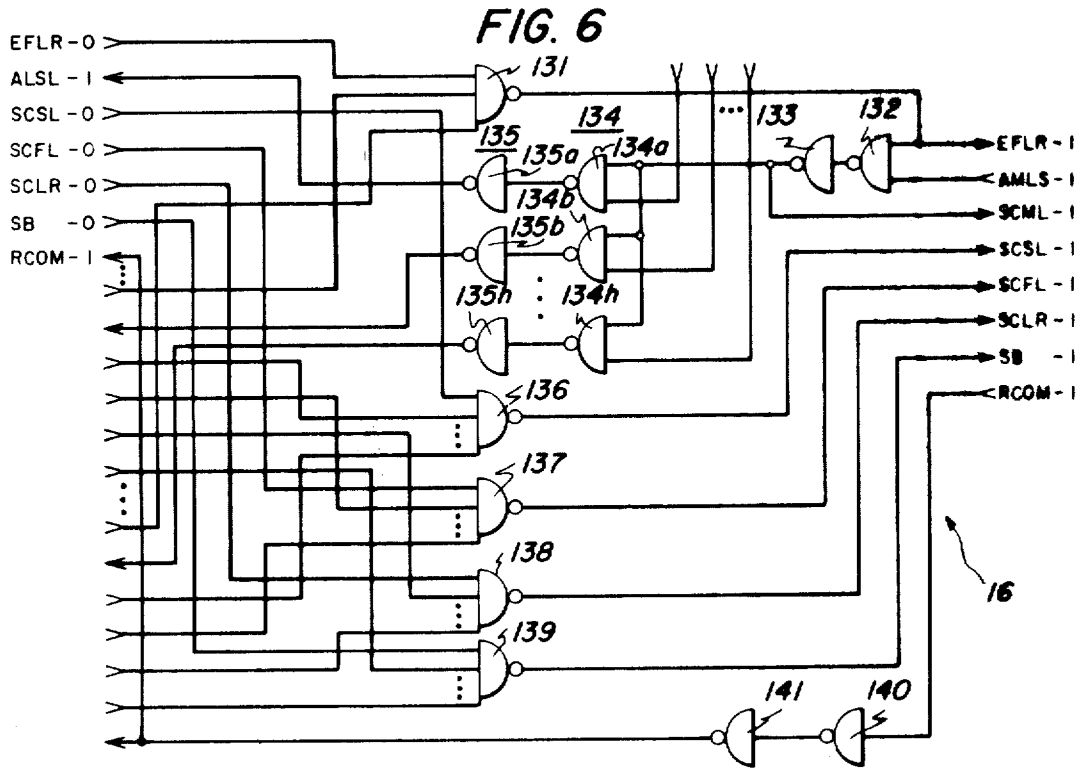
FIG. 6 is a logic diagram of a master level selector of the data acquisition and identification system of the present invention.

The function of the level selectors 14, 15 and 16 will now be described with reference to FIGS. 4, 5 and 6, respectively. The event flag line from each receiver of the group 13*a* through 13*h*, for example, is brought to one input of an eight-input NAND-gate 81 of the first level selector 14*a*. Since each EFLR line is normally at a logic "1" output, and an event flag, indicated by a logic "0," causes the output of NAND-gate 81 to switch from a logic "0" to a logic "1" which is inverted in an inverter 82 and passed on to the next higher level selector. In this event, the next higher selector is the second level selector 15*a* as illustrated in FIG. 5 wherein the event flag line is again connected to an eight-input NAND-gate 101 which has its output connected to an inverter 102. Upon receipt of an event flag from inverter 82, the output of NAND-gate 101 switches from a logic "0" to a logic "1" which is then inverted in inverter 102 and passed on to the next higher level. As illustrated in FIG. 1, the next higher level is the master level 16. The event flag line from the second level selector 15*a* is connected to a NAND-gate 131 having seven other inputs connected to the outputs of other second level selectors 15*b* through 15*k*, for example.

Figure 8:
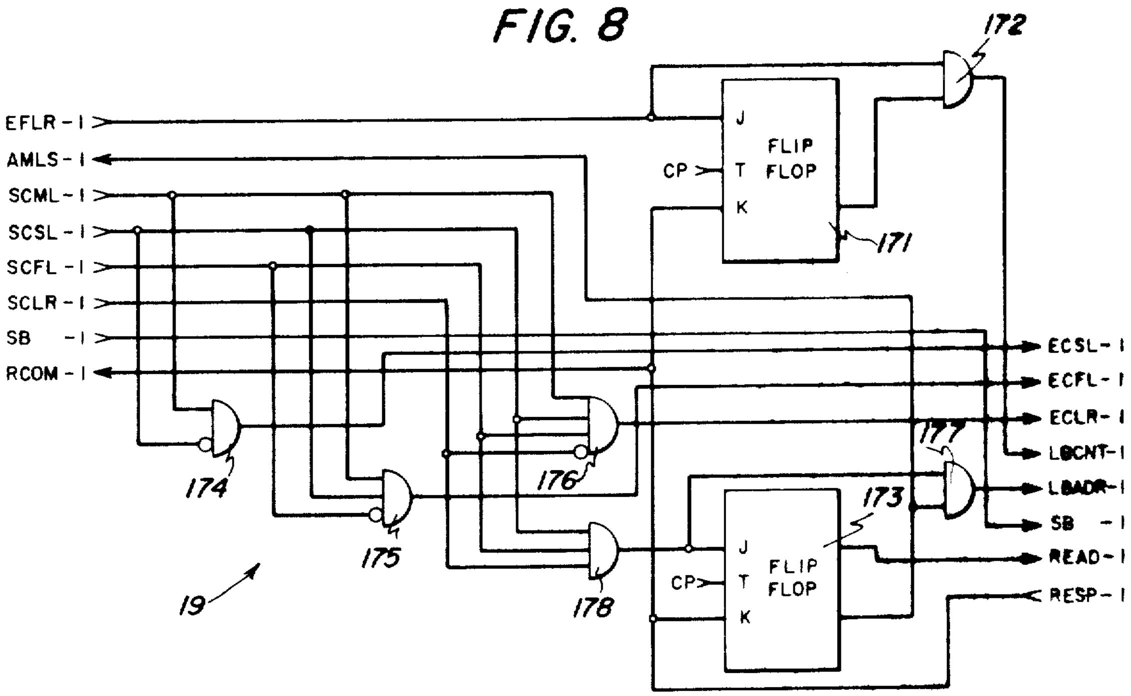
FIG. 8 is a logic diagram of a control unit of the data acquisition and identification system.

The output of NAND-gate 131 is connected to the set input of a J-K flip-flop 171 and also to one input of a eight-input AND-gate 172 which has a second input connected to the reset output of flip-flop 171, both located in the control unit 19 as illustrated in FIG. 8. Since the inputs to AND-gate 172 are normally in dissimilar logic conditions, the output of AND-gate 172 is a logic "0"; however, upon receipt of an event flag from a line receiver transmitted through NAND-gates 81, 101 and 131, the output of AND-gate 172 switches to a logic "1." This signal, designated load buffer counter, LBCNT, is connected to a buffer register 201 in the address scanner and transfer buffer unit 17. The logic "1" appearing at the input of buffer 201 stores the contents of a continuously clocked counter 202. In the embodiment illustrated herein, the counter 202 is, for example, a 16-bit counter having $2^{16}$ possible different counts. The buffer 201 stores the particular count occurring at the time of the event flag and subsequently, as will be described hereinafter, upon command transfers this count to the computer 18.

Figure 7:
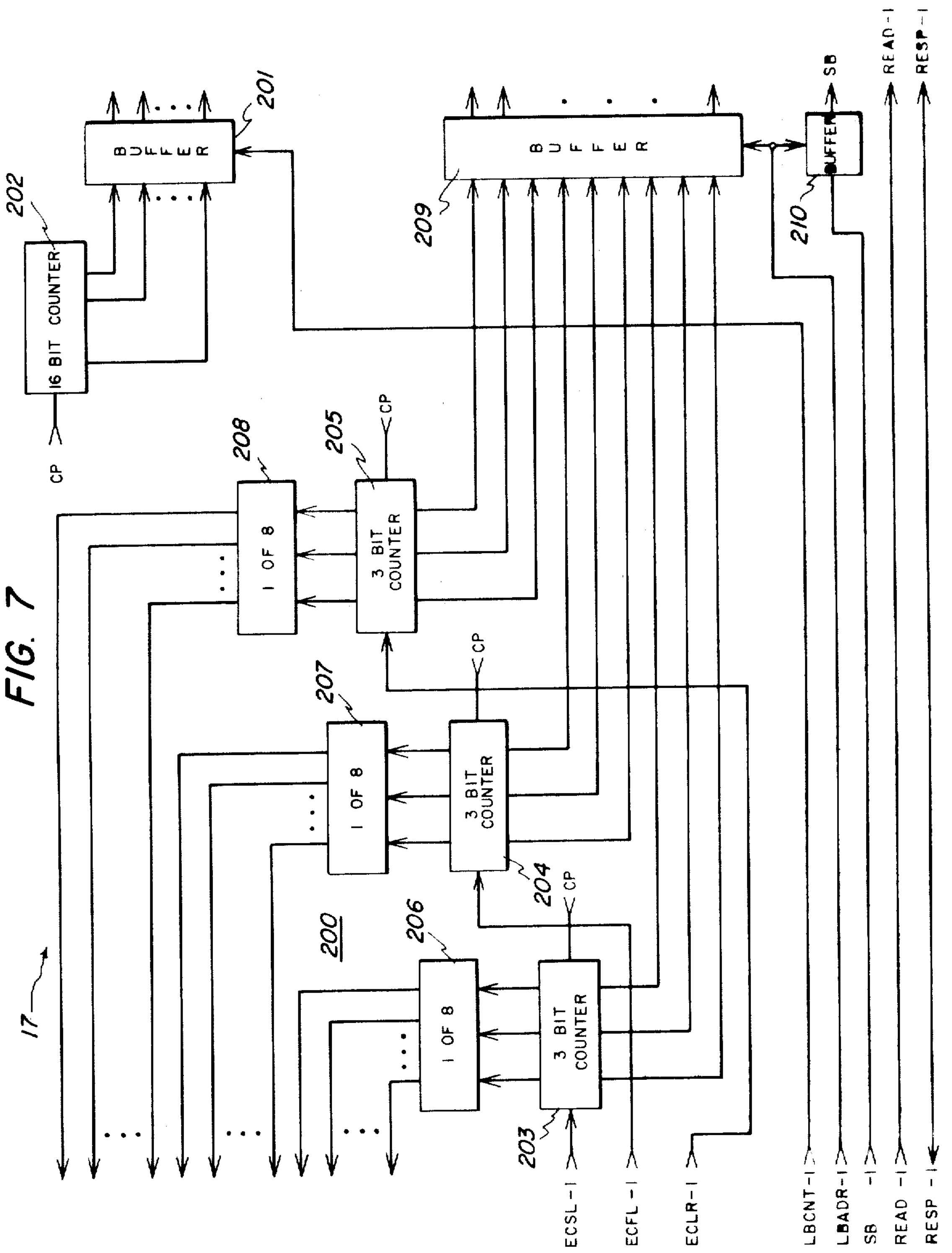
FIG. 7 is a logic diagram of an address scanner and transfer buffer for use in accord with the embodiment of FIG. 1.

In addition to enabling the buffer 201 to store the contents of counter 202, the event flag signal also initiates the search operation for determining from which line receiver the event flag originated. This is achieved by applying the event flag signal from NAND-gate 131 in the master level selector 16 to one input of a two-input NAND-gate 132 which has its second input connected to the reset output of a second J-K flip-flop 173 contained in the control unit 19. This signal, designated the address master level select signal (AMLS) is normally at a logic "1" condition so that upon receipt of a logic "1" from NAND-gate 131, NAND-gate 132 switches from a logic "1" to a logic "0." This signal, designated select condition master level (SCML) is inverted in inverter 133 and is sent to an AND-gate 174 through which the signal, designated enable condition second level (ECSL), passes and enables, for example, a 3-bit counter 203 which forms a part of a line address register 200 comprising, for example, three 3-bit counters 203, 204 and 205, and respectively connected to, for example, three binary-to-octal decoders 206, 207 and 208. It is to be understood that the specific configuration of the address register 200 may vary with the number of intermediate level selectors and the "fan-in" capabilities of the logic elements employed. For example, the address register 200 illustrated in FIG. 7 is readily adaptable to an acquisition and identification system having three levels of selection with eight inputs per selector. Obviously other configurations will occur to those skilled in the art.

The ECSL signal from AND-gate 174 enables the 3-bit counter 203 which immediately begins its binary count. Decoder 206 associated therewith has its outputs connected to the inputs of NAND-gates 134*a* through 134*h* of coincidence gates 134. The function of coincidence gates 134 is to provide sequential input signals through inverters 135*a* through 135*h* to each second level selector 15*a* through 15*j* so as to determine through which second level selector the event flag was transmitted. This is performed by connecting the outputs of inverters 135*a* through 135*h* to a NAND-gate 103 in each second level selector 15*a* through 15*j*. These signals are designated address line second level (ALSL).

As illustrated in FIG. 5, NAND-gate 103 of second level selector 15*a* has a second input from NAND-gate 101 which during this interval has an active "1" at its output indicating the presence of an event flag. Since the ALSL line from the master level selector inverter 135*a* has a logic "1" at its output during this interval, NAND-gate 103 switches to a logic "0" at its output. This signal, designated the select condition second level (SCSL), is connected back to the master level through a NAND-gate 136 with its other inputs connected to the outputs of other second level selectors. Upon receipt of a logic "0" at any of its inputs, NAND-gate 136 switches to a logic "1" condition indicating a select condition from second level selector 15*a*. This SCSL signal is connected to an inverting input of AND-gate 174 which, having its output connected to 3-bit counter 203, inhibits its counting action. The count existing on 3-bit counter 203, indicative of the address of the particular second level selector which passed the event flag, is ready to be gated into a buffer 209 which stores this information for subsequent transfer upon command to the computer unit 18.

At the same time that NAND-gate 103 sends a SCSL signal back to the master level and hence to the 3-bit counter 203, a signal is also coupled from NAND-gate 103 through an inverter 104 to coincidence NAND-gates 105*a* through 105*h* and generally designated by the numeral 105. A second input to each of the NAND-gates 105 is derived from the binary-to-octal decoder 207. The 3-bit counter 204 which drives decoder 207 is enabled when the SCSL signal appears at one input of the 3-input AND-gate 175. AND-gate 175, in addition to requiring the presence of the SCSL signal also has SCML signal and a third input which is obtained from NAND-gate 137 which has a logic "0" at its output during this interval. AND-gate 175 upon receipt of the SCSL signal issues an enable signal designated enable condition first level (ECFL) to the 3-bit counter 204. The counting action of counter 204 then begins and is decoded in the binary-to-octal decoder 207 whose outputs sequentially enable NAND-gates 105 so that a search can be made of the second level selector to determine which first level selector transmitted the event flag. This determination is made by the coincidence of the EFLR and AFLS signals in NAND-gate 83 of the first level selector transmitting the event flag. The coincidence signal from NAND-gate 83, designated select condition first level (SCFL), is connected to the 3-bit counter 204 via NAND-gate 107, inverter 108, NAND-gate 137 and AND-gate 175 to inhibit the further counting action of counter 204. The contents of the counter 204 are then ready to be stored in the buffer 209 as are the contents of counter 203.

The operation of the data acquisition and identification system has thus far located the address of the first and second level selectors and it is only necessary to now determine from which line receiver the event flag was generated. To perform this operation, a search must be made of each line receiver in the group connected to the first level selector which transmitted the event flag. The final portion of the information necessary to determine the address of the line receiver generating the event flag is obtained in the following manner. Upon receipt of the SCFL signal, a 4-input AND-gate 176 generates an enable signal, designated enable condition line receiver (ECLR) signal, for 3-bit counter 205, the output count of which is decoded by the binary-to-octal decoder 208. The decoder output lines are connected to one input of coincidence NAND-gates **84*a* through 84*h* and generally designated by the numeral 84. The second input to NAND-gates 84 is obtained from an inverter 85 having its input connected to the output of NAND-gate 83. The output of NAND-gates 84 are coupled through inverters 86*a* through 86*h*, respectively, to the interrogation gate of each line receiver connected to the selected first level selector. In the embodiment of the line receiver illustrated in FIG. 2, the interrogation gate is NAND-gate 35 and in the embodiment of the line receiver illustrated in FIG. 3, the interrogation gate is NAND-gate 67**.

As the counter 205 continues to count, each line receiver is sequentially interrogated so as to determine which receiver generated the event flag. The line receiver generating the event flag will produce a logic "0" indicating a select condition line receiver (SCLR). The SCLR output of the interrogation gate is connected through a NAND-gate 87 and inverter 88 of the first level selector and through NAND-gate 109 and inverter 110 of the second level selector and then through NAND-gate 138 of the master level selector to the inverting input of 4-input AND-gate 176. The output of AND-gate 176 thereupon reverts to a logic "0" to inhibit further counting of counter 205. The contents of counter 205 are then ready to be stored in buffer 209 to complete the address of the particular line receiver which generated the event flag.

As described previously, in addition to requiring the line address information and the count of counter 202, it is also desirable to have the sign or sense of the change indicated by the line receiver. The sign information is obtained directly from the line receiver; in particular, as described above, SBLR line 48 indicates an active "0" whenever a logic "0" appears on line 30. This active "0" is brought to the computer 18 through NAND-gate 89 and inverter 90 of the first level selector, NAND-gate 111 and inverter 112 of the second level selector and NAND-gate 139 of the master level selector to the buffer 210 which transfers this information along with the line address information in counters 203, 204 and 205 upon receipt of a load buffer address (LBADR) signal from an AND-gate 177 in the control unit 19.

The LBADR signal is obtained in the following manner. The select condition lines, i.e., SCSL, SCFL and SCLR, are all in the logic "1" state after the above-described sequence. This causes AND-gate 178 to assume a logic "1" state. Until J-K flip-flop 173 assumes a logic "1" state, which occurs on the next clock pulse, CP, the LBADR output of AND-gate 177 is a logic "1" and the contents of the address counters 203, 204 and 205 are loaded into the buffer 209.

After this time, J-K flip-flop 173 produces an output read signal (READ) to the computer unit 18 to advise the computer of the forthcoming information from the buffers 209 and 210. The computer unit 18, in response thereto, sends a response signal (RESP) to the reset input of J-K flip-flop 173 and to the reset input of J-K flip-flop 171. This response signal causes J-K flip-flop 171 to be reset and the contents of buffer 201 to be transferred to the computer unit 18.

The response signal also is used to initiate the restore command RCOM which is coupled to the master level 16 through inverters 140 and 141 to the second level selector **15*a* through inverters 113 and 114 and to the first level selector 14*a* through inverters 91 and 92 back to the line receiver 13*a*** to reset the line receiver which generated the event flag as described previously. The data acquisition and storage system has now completed a cycle of operation and is ready for a new event to occur.

The foregoing description illustrates how an event occurring on one of a plurality of input lines is processed in one embodiment of the invention and how line address information, sense and time of occurrence information are transferred to a computer for storage and subsequent processing. In actual operation, the aforementioned information for a plurality of events occurring on different input lines is stored in the computer so that upon occurrence of another event on the same line, certain additional information may be obtained regarding the particular input line.

The data acquisition and identification system of the instant invention has several advantages over prior art systems employed for similar purposes. In particular, data acquisition and identification systems in accord with the instant invention exhibit faster scanning rates with the attendant ability to search many lines in a short period of time. Additionally, with the transmission of logic signals between the source of the signal and a central processing area, greater tolerance or immunity to noise is achieved. This latter feature is of particular significance in that improved accuracy of signal processing results. Also, by eliminating mechanical switches and other mechanical components, devices made in accord with the instant invention exhibit greater reliability and by virtue of the simplicity of the system, reduced costs of manufacture and maintenance are achieved.

By way of example, some of the foregoing advantages of the instant invention can be more readily appreciated by considering a data acquisition and identification system having the capability for monitoring the status of 512 signal sources. If such a system were operated with a clock frequency of 2 megacycles per second, approximately two inputs per second per line could be accommodated. Further, with a "fan-in" capability of eight inputs per NAND-gate, 64 first level selectors, eight second level selectors and one master level selector could be conveniently used to perform the desired scanning function. Additionally, address register 200 would conveniently comprise three, 3-bit counters and associated decoders for determining the line address of any particular line on which an event flag has occurred.

The speed with which the line address information is obtained depends upon the condition of the address register resulting from the previous address information contained thereon. For example, since 3-bit counter 203 and decoder 206 associated therewith have eight possible output conditions, it is possible that 3-bit counter 203 would make a full count before finding the particular line address. However, it is also possible that 3-bit counter 203 and would not have to count at all if the line address were the same as on the previous scan or search operation. On the average, however, counter 203 would make four counts. Similarly, counters 204 and 205 would also be required to count on the average, four counts per scan. Therefore, on the average, 12 counts would be required to find a particular line receiver which generated an event flag. Since the clock frequency is 2 megacycles per second, this would amount to a total search time of 6 microseconds. The maximum time required would be 24 counts or 12 microseconds and the minimum being 0 microseconds, in the event that the same line receiver generated successive event flags. Obviously, higher clock rates would proportionately reduce the scan time.

Since the data acquisition and identification system of the instant invention is capable of high scan rates, and some present-day computers are not able to accept information at this rate, it may be necessary to apply this information to a storage or memory device for subsequent transfer to the computer at a rate acceptable to the computer. Such storage devices are well known in the art; for example, magnetic storage tapes or discs could be employed if desired.

Data acquisition and identification systems made in accord with the teachings of the instant invention find wide application in the digital data field. For example, in addition to being responsive to the logic level signals, the data acquisition and identification system can respond to simple switch closures or events which can be electrically represented by a voltage, current or impedance transition or fluctuation. Additionally, the input of the line receiver can be connected to a teletype signal which is then processed as described above so that a computer rather than a teletype machine produces the desired alpha numeric readout.

Obviously those skilled in the art can appreciate that many modifications and changes can be made to the particular embodiments of the invention disclosed herein without departing from the spirit and scope thereof. For example, the number of levels of selection can be increased or decreased depending upon the number of input signals to be monitored. Additionally, for all applications it may not be necessary to know the particular sign or sense of the change; therefore, in such instances, it is unnecessary to include the circuitry associated therewith. In still other situations, it may be only necessary to identify the particular signal source on which an event occurred without regard to the time of occurrence. In such applications, the circuitry for performing this function may also be eliminated.

It should also be appreciated that data acquisition and identification systems made in accord with the teachings of the instant invention exhibit a very low probability for error. For example, in the situation where 512 signals are monitored, the data acquisition and identification system disclosed herein has the capability of accepting approximately 1,000 events per second at an average search time of approximately 6 microseconds. If a coincidence of two or more event flags should occur, the system will process the first event found during the search operation. After the system is restored, the processing of the second event begins immediately. In this way, there is no error of line address identification even with two or more coinciding events. There is, however, an uncertainty concerning the time of occurrence of the events. This uncertainty, however, is on the order of search time and for the example illustrated is 6 microseconds on the average. If this exceedingly small error can not be tolerated, lockout techniques can be employed.

From the foregoing description, it is readily apparent that there is disclosed herein a new and novel data acquisition and identification system with improved accuracy of signal processing, with greater tolerance to noise signals and with added facility to monitor a large number of signal sources and identify the occurrence of an event from any signal source.

What I claim as new and desire to secure by Letters Patent of the United States is:

1. A data acquisition and identification system adapted to monitor a plurality of signal sources comprising:

a plurality of receiver means adapted to be connected to said plurality of signal sources and responsive thereto for generating an event flag from the receiver means having a changed signal condition;

gating means having inputs connected to each said receiver means for providing an enable signal in response to an event flag from any receiver means;

means responsive to said enable signal to search said gating means for the receiver means generating said event flag, said means including an address scanner and counter which identifies the receiver means generating the event flag by the contents of the address counter.

2. A data acquisition and identification system as recited in claim 1 further comprising:

means to record the time of occurrence of said event flag.

3. A data acquisition and identification system as recited in claim 1 further comprising:

means to record the sense of the change in signal condition.

4. A data acquisition and identification system as recited in claim 2 wherein said means to record the time of occurrence of said event flag comprises:

a continuously clocked counter, the contents of which at the time the event flag is received are stored in a storage device.

5. A data acquisition and identification system as recited in claim 1 wherein said said address scanner comprises:

at least one counter and decoder associated therewith enabled by said enable signal to provide decoded signals;

a plurality of coincidence gates each responsive to an event flag from a different receiver means and to said decoded signals to provide an inhibit signal to said counter upon coincidence of said event flag and one of said decoded signals, the final count of said counter being representative of an address of the receiver means generating said event flag.

6. A data acquisition and identification system as recited in claim 5 further comprising:

a continuously counting counter;

a buffer storage means associated with said counter for storing the count thereof upon receipt of an event flag.

7. A data acquisition and identification system as recited in claim 6 further comprises:

means to record the sense of the change in signal condition.

8. A method for acquiring and identifying data from $n$ signal sources where $n$ is an integer greater than one, said method comprising:

monitoring said $n$ signal sources with $n$ receivers, said receivers generating an event flag in response to a changed signal condition from said sources;

combining the outputs of said $n$ receivers into $k$ first level selectors and combining the outputs of said $k$ first level selectors into $j$ second level selectors and combining the outputs of said $j$ second level selectors into a master level selector which issues an enable signal in response to an event flag from any line receiver, where $k$ and $j$ are integers and $n$ is greater than $k$ which is greater than $j$;

sequentially searching said master level selector for the second level selector which transmitted said event flag and then searching the selected second level selector for the first level selector which transmitted said event flag and then searching the selected first level selector for the receiver generating said event flag; and identifying and recording the receiver generating said event flag by the contents of an address register.

9. The method of claim 8 further comprising:

recording the time of occurrence of an event flag.

10. The method of claim 9 wherein the step of recording the time of occurrence is accomplished by storing the contents of continuously counting counter in a storage device at the time of an event flag.

11. The method of claim 8 further comprising:

sensing the direction of signal change which causes said event flag.

12. The method of claim 8 further comprising:

transferring the address of the line receiver generating said event flag to a storage device.

13. The method of claim 9 further comprising:

sensing the direction of signal change which causes said event flag.

14. The method of claim 13 further comprising:

transferring the address of the line receiver generating said event flag, the time of occurrence of said event flag and the direction of signal change to a utilization device.

* * * * *